US010082806B2

(12) United States Patent
Takijiri et al.

(10) Patent No.: US 10,082,806 B2
(45) Date of Patent: Sep. 25, 2018

(54) FLOW-RATE CONTROL DEVICE AND FLOW-RATE CONTROL PROGRAM

(71) Applicant: HORIBA STEC, Co., Ltd., Kyoto-shi, Kyoto (JP)

(72) Inventors: Kotaro Takijiri, Kyoto (JP); Keita Shimizu, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 341 days.

(21) Appl. No.: 14/894,941

(22) PCT Filed: Aug. 28, 2014

(86) PCT No.: PCT/JP2014/072540
§ 371 (c)(1),
(2) Date: Nov. 30, 2015

(87) PCT Pub. No.: WO2015/030097
PCT Pub. Date: Mar. 5, 2015

(65) Prior Publication Data
US 2016/0124440 A1    May 5, 2016

(30) Foreign Application Priority Data

Aug. 28, 2013   (JP) .................................. 2013-177384

(51) Int. Cl.
*G05D 7/00*     (2006.01)
*G05D 7/06*     (2006.01)
(52) U.S. Cl.
CPC .................................. *G05D 7/0635* (2013.01)
(58) Field of Classification Search
CPC .................................................. G05D 7/0635
See application file for complete search history.

(56) References Cited

U.S. PATENT DOCUMENTS 5,315,530 A * 5/1994 Gerhardt .............. G05D 7/0617
700/282
2010/0250216 A1* 9/2010 Narr .................... G06F 17/5018
703/10
(Continued)

FOREIGN PATENT DOCUMENTS

CN    102467132 A    5/2012
JP    62219001 A    9/1987
(Continued)

OTHER PUBLICATIONS

ISA Japanese Patent Office, International Search Report of PCT/JP2014/072540, dated Nov. 25, 2014, WIPO, 4 pages.
(Continued)

*Primary Examiner* — Christopher E. Everett
(74) *Attorney, Agent, or Firm* — Alleman Hall Creasman & Tuttle LLP

(57) ABSTRACT

A flow-rate control unit is constituted by a sensor model storage unit, a flow-rate simulation value output unit that outputs a flow-rate simulation value which is a flow-rate value that the sensor model outputs when a flow-rate setting value is input, a feedback control unit that outputs a flow-rate feedback value based on a deviation between a flow-rate measurement value and the flow-rate simulation value, and a valve control unit that controls a valve application voltage that is applied to a valve based on the flow-rate feedback value and a flow-rate feedforward value that is calculated from the flow-rate setting value, and the flow-rate simulation value output unit is configured to output the flow-rate simulation value in a state where a predetermined time delay exists with respect to the flow-rate setting value.

9 Claims, 7 Drawing Sheets

(56) References Cited

U.S. PATENT DOCUMENTS

| | | | |
|---|---|---|---|
| 2011/0054702 A1 | 3/2011 | Smirnov et al. | |
| 2012/0065786 A1* | 3/2012 | Beraud | E03F 7/00 700/282 |
| 2014/0350737 A1* | 11/2014 | Goodman | G06F 17/5009 700/282 |

FOREIGN PATENT DOCUMENTS

| | | | |
|---|---|---|---|
| JP | 05113825 A | 5/1993 |
| JP | 07271447 A | 10/1995 |
| JP | 09171412 A | 6/1997 |
| JP | 10232714 A | 9/1998 |
| JP | 2009535716 A | 10/2009 |
| JP | 2009543229 A | 12/2009 |
| JP | 2011048502 A | 3/2011 |
| JP | 2011204265 A | 10/2011 |
| JP | 2012103812 A | 5/2012 |
| JP | 2012160215 A | 8/2012 |
| TW | 201214072 A | 4/2012 |
| WO | 2007127897 A2 | 11/2007 |
| WO | 2008005883 A2 | 1/2008 |

OTHER PUBLICATIONS

State Intellectual Property Office of the People's Republic of China, Office Action and Search Report Issued in Application No. 201480031184.6, dated Apr. 4, 2018, 8 pages.

* cited by examiner (a) ACQUIRE STEP RESPONSE OF PREDETERMINED AREA IN MODEL IDENTIFICATION MODE (b) IDENTIFY SENSOR MODEL FROM RESPONSE CHARACTERISTICS EXCLUDING DEAD TIME (c) CALCULATION MODE OF FLOW-RATE SIMULATION VALUE IN SENSOR MODEL UNIT

FLOW-RATE CONTROL DEVICE AND FLOW-RATE CONTROL PROGRAM

TECHNICAL FIELD

The present invention relates to a flow-rate control device and a flow-rate control program that are for controlling the flow rate of a fluid.

BACKGROUND ART

A flow-rate control device that is used in a semiconductor manufacturing process is required to quickly track the real flow-rate value to a flow-rate setting value that is set by a user.

In response to this requirement, a flow-rate control device that is shown in Patent Document 1, for example, is provided with a flow-rate sensor, a valve, and a flow-rate control unit that controls the flow rate using the valve, with the flow-rate control unit being configured to control the degree of opening of the valve using two degree-of-freedom control that combines feedback control according to a flow-rate measurement value that is output from the flow-rate sensor and feedforward control according to the flow-rate setting value that is set.

That is, this flow-rate control device is intended to track the real flow-rate value to the flow-rate setting value at high speed using feedforward control, while compensating for overshoot and the like using feedback control.

However, even with the two degree-of-freedom flow-rate control device described in Patent Document 1, it is difficult to ideally shape the response characteristics of the real flow-rate value during the transient response.

The response of the real flow-rate value in the case where a step input is input as the flow-rate setting value will now be specifically considered. Since the flow-rate measurement value that is output from the flow-rate sensor has a time delay relative to the real flow-rate value of the fluid that flows through the flow channel, a large deviation will occur in the early stages of the transient response when the deviation between the flow-rate setting value and the flow-rate measurement value is simply fed back. Accordingly, in early stages of the transient response, the valve will be controlled to be at a larger degree of opening than the fixed degree of opening originally required as specified by feedforward control, and overshoot will occur. Thereafter, the valve will be controlled by feedback control such that the degree of opening is reduced so as to eliminate the overshoot.

Thus, when a time delay exists in the flow-rate measurement value that is measured with the flow-rate sensor, it is difficult to track the real flow-rate value to the flow-rate setting value due to problems such as overshoot occurring or control becoming unstable when gain is increased. Such control-related problems that occur due to time delays become particularly marked in the case where the flow-rate sensor is a thermal flow-rate sensor.

That is, it is not currently possible to limit feedback control to when conditions are suitable in the case of performing two degree-of-freedom flow-rate control.

CITATION LIST

Patent Documents

Patent Document 1: US 2011/0054702A

SUMMARY OF INVENTION

Technical Problem

The present invention has been made in view of the abovementioned problem, and has an object to provide a flow-rate control device that reduces the influence that a time delay of a flow-rate measurement value that is output from a flow-rate sensor exerts on flow-rate control, and is able to track the real flow-rate value to a flow-rate setting value at high speed.

Solution to Problem

That is, a flow-rate control device of the present invention is provided with a flow-rate sensor that measures a flow rate of a fluid that flows through a flow channel, a valve provided in the flow channel, and a flow-rate control unit that controls a flow rate using the valve based on a flow-rate setting value and a flow-rate measurement value that is measured with the flow-rate sensor, the flow-rate control unit being constituted by a sensor model storage unit that stores a sensor model that simulates a response characteristic of the flow-rate sensor, a flow-rate simulation value output unit that outputs a flow-rate simulation value which is a flow-rate value that is calculated based on the flow-rate setting value and the sensor model, a feedback control unit that outputs a flow-rate feedback value based on a deviation between the flow-rate measurement value and the flow-rate simulation value, and a valve control unit that controls the valve based on the flow-rate feedback value and a flow-rate feedforward value that is calculated from the flow-rate setting value, and the flow-rate simulation value output unit being configured to output a flow-rate simulation value that includes a predetermined time delay.

With such a flow-rate control device, the flow-rate feedback control unit is configured to output a flow-rate feedback value based on the deviation between a flow-rate measurement value that includes a time delay and a flow-rate simulation value in which the time delay is reproduced by the flow-rate simulation value output unit, thus enabling a flow-rate feedback value that reflects the time delay of the flow-rate sensor to be output.

Accordingly, problems such as overshoot that are caused by a superfluous flow-rate feedback value being fed back and the degree of opening of the valve being changed due to the time delay of the flow-rate sensor in the early stages of the transient response can be prevented. More specifically, in the early stages of the transient response, the flow-rate feedback value is not output from the flow-rate feedback control unit, and instead the valve control unit applies a voltage suitable for the flow-rate setting value that is specified by the flow-rate feedforward value to the valve and fixes the degree of opening of the valve, thus enabling the rate of rise of the real flow-rate value to be increased.

Furthermore, to ensure that the time delay can also be reproduced accurately while realizing a simple and accurate sensor model that does not include the time delay, the flow-rate simulation value output unit may be configured to start outputting the flow-rate simulation value based on the sensor model and the flow-rate setting value after the flow-rate measurement value that is measured with the flow-rate sensor reaches a predetermined threshold. With such a flow-rate control device, the time delay can be accurately reproduced at the output start timing of the flow-rate simulation value, thus enabling the flow-rate simulation value that is output from the flow-rate simulation value output unit to be approximated to the flow-rate measurement value that is actually output from the flow-rate sensor with only simple modeling, and the response characteristics of two degree-of-freedom flow-rate control to be improved.

To ensure that the valve is constantly maintained at the required degree of opening from the start of flow-rate control using flow-rate control based on the flow-rate feedforward value and that a fast response is realized, even in the case where a Q-V characteristic of the valve changes due to influences such as a change in external temperature, the valve control unit may be constituted by a Q-V characteristic storage unit that stores a Q-V characteristic which is the relationship between the valve application voltage and the flow rate of the fluid that flows through the flow channel in the case where the valve application voltage is applied to the valve, and a voltage output unit that calculates the valve application voltage corresponding to a flow-rate input value which is the sum of the flow-rate feedforward value and the flow-rate feedback value based on the Q-V characteristic and outputs the calculated valve application voltage to the valve, and a Q-V characteristic correction unit that corrects the Q-V characteristic stored in the Q-V characteristic storage unit based on the flow-rate feedback value may be further provided.

To ensure that the Q-V characteristic is corrected such that the overshoot amount or the like is reduced and the real flow-rate value is substantially the same as the flow-rate setting value when the transient response ends, the Q-V characteristic correction unit may be configured to perform correction by offsetting the Q-V characteristic in the V-axis positive direction in the case where an integral of the flow-rate feedback value within a predetermined time period from the start of flow-rate control is positive, and to perform correction by offsetting the Q-V characteristic in the V-axis negative direction in the case where the integral is negative. Also, by configuring the Q-V characteristic correction unit to determine the offset amount of the Q-V characteristic in the V-axis direction based on the absolute value of the integral of the flow-rate feedback value within a predetermined time period from the start of flow-rate control, it becomes possible to correct the Q-V characteristic to reflect the degree of divergence between the stored Q-V characteristic and the current Q-V characteristic.

To ensure that the response characteristics of the flow-rate sensor can be accurately identified even with a simple model and that the accuracy of flow-rate control can be enhanced by reducing modeling errors as much as possible, a sensor model identification unit that identifies the sensor model based on an open loop response characteristic acquired after a step input is input as the flow-rate setting value and the flow-rate measurement value that is output from the flow-rate sensor exceeds the threshold may be further provided.

To ensure that hysteresis is suppressed and the response characteristics of flow-rate control can be improved with regard to cases where hysteresis tends to appear in the Q-V characteristics of the valve when normal voltage control is performed, the valve may be a piezo valve, a reference capacitor connected in series to the piezo valve and grounded at one end may be further provided, and the valve control unit may be constituted to hold the voltage that is applied to the piezo valve at the valve application voltage.

The effects of the flow-rate control according to the flow-rate control device of the present invention are particularly evident in the case where the flow-rate sensor is a thermal flow-rate sensor because of the large time delay of the flow-rate measurement value that is output from the flow-rate sensor.

To ensure that flow-rate control performance equivalent to the flow-rate control device of the present invention can be realized with an existing flow-rate control device by means such as overwriting a flow-rate control program, a flow-rate control program storage medium storing a flow-rate control program that is used in a flow-rate control device provided with a flow-rate sensor that measures the flow rate of a fluid that flows through a flow channel and a valve provided in the flow channel may be used, the flow-rate control program causing the function of a flow-rate control unit that controls the flow rate using the valve based on a flow-rate setting value and a flow-rate measurement value that is measured with the flow-rate sensor to be exhibited, the flow-rate control unit being constituted by a sensor model storage unit that stores a sensor model that simulates a response characteristic of the flow-rate sensor, a flow-rate simulation value output unit that outputs a flow-rate simulation value which is a flow-rate value that is calculated based on the flow-rate setting value and the sensor model, a feedback control unit that outputs a flow-rate feedback value based on a deviation between the flow-rate measurement value and the flow-rate simulation value, and a valve control unit that controls the valve based on the flow-rate feedback value and a flow-rate feedforward value that is calculated from the flow-rate setting value, and the flow-rate simulation value output unit being configured to output a flow-rate simulation value that includes a predetermined time delay. Also, such a flow-rate control program may be recorded on a storage medium such as CD, DVD, HDD or flash memory, and may be used at the time of installation.

Advantageous Effects of Invention

According to the flow-rate control device of the present invention as described above, the feedback control unit is configured to output a flow-rate feedback value based on the deviation between a flow-rate simulation value output based on the sensor model and in which a time delay is reflected and a flow-rate measurement value that is measured with the flow-rate sensor, thus enabling flow-rate feedback that reflects the time delay of the flow-rate sensor. Accordingly, the flow-rate feedback value at the start of flow-rate control will be substantially zero and the degree of opening of the valve is controlled by only the flow-rate feedforward value, thus enabling a faster response to the real flow-rate value without causing overshoot or the like. Furthermore, the time delay is reproduced by starting output of the flow-rate simulation value based on the sensor model and the flow-rate setting value after the flow-rate measurement value reaches a predetermined threshold, thus enabling the time delay to be accurately reproduced with a simple sensor model and the response characteristics to be improved.

DESCRIPTION OF REFERENCE NUMERALS

Figure 1:
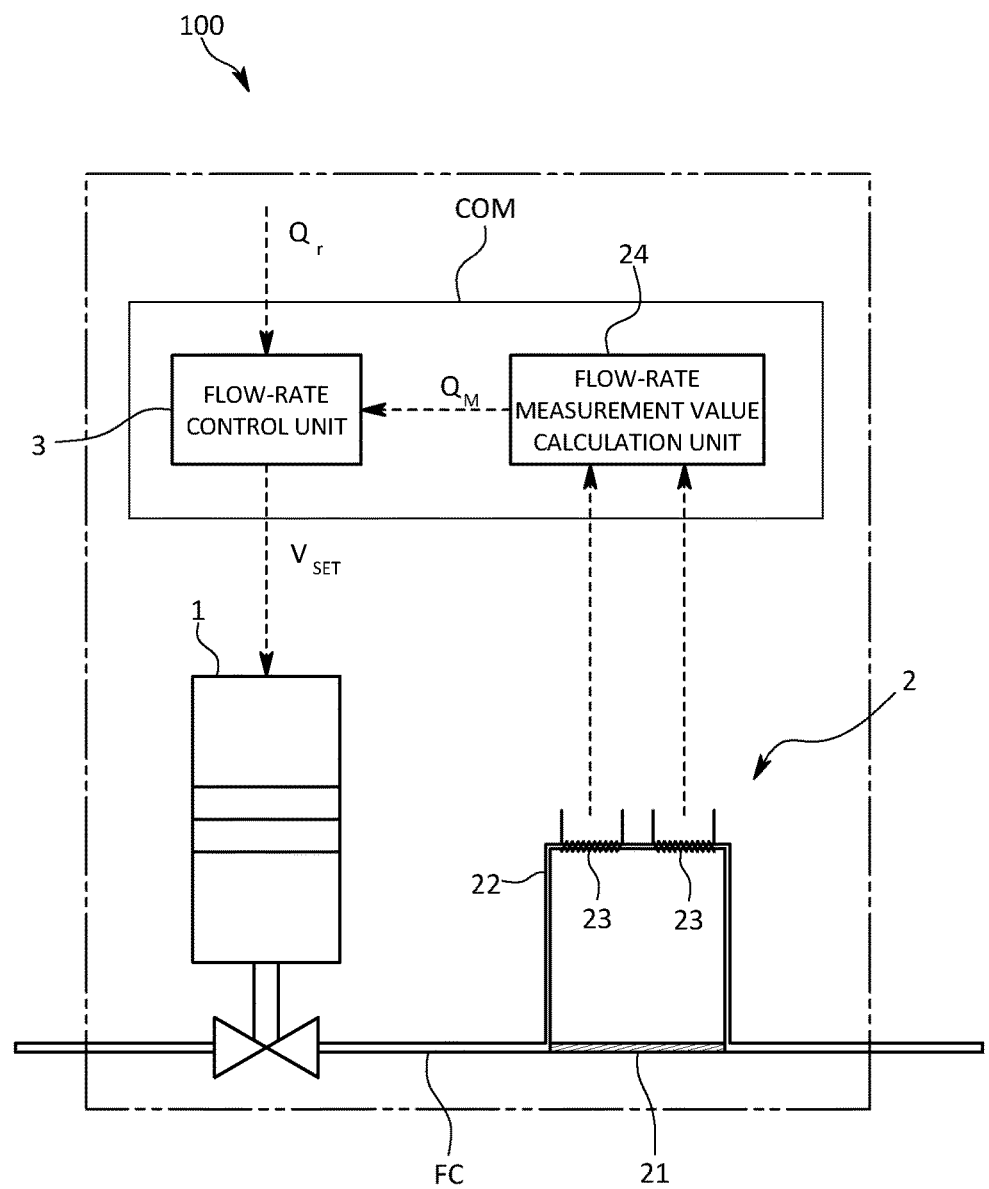
FIG. 1 is a schematic diagram showing a flow-rate control device according to one embodiment of the present invention.

100 . . . Mass flow controller (flow-rate control device)
1 . . . Piezo valve (valve)
11 . . . Reference capacitor
12 . . . Operational amplifier
2 . . . Thermal flow-rate sensor (flow-rate sensor)
21 . . . Laminar flow element (fluid resistor)
22 . . . Narrow tube
23 . . . Heating resistor
24 . . . Flow-rate measurement value calculation unit
3 . . . Flow-rate control unit
SM . . . Sensor model unit
31 . . . Sensor model storage unit
32 . . . Flow-rate simulation value output unit
33 . . . Feedback control unit
34 . . . Sensor model identification unit
VC . . . Valve control unit
35 . . . Q-V characteristic storage unit
36 . . . Voltage output unit
37 . . . Q-V characteristic correction unit
Description of Embodiments Configuration of Present Embodiment A flow-rate control device according to one embodiment of the present invention will be described with reference to the drawings.

The flow-rate control device of the present embodiment is a mass flow controller 100 that is used in order to introduce a gas containing a substance to be vapor-deposited onto a substrate into a chamber in which vapor deposition is performed at a predetermined flow-rate setting value $Q_r$ in a semiconductor manufacturing process, for example.

This mass flow controller 100 has an inlet and an outlet that are attached to a flow channel extending to the chamber during the semiconductor manufacturing process as shown in FIG. 1, and controls the flow rate of gas that flows through the flow channel. More specifically, the mass flow controller 100 is provided with an internal flow channel FC, a valve 1 provided in the internal flow channel FC, a flow-rate sensor 2 that measures the flow rate of the fluid that flows through the internal flow channel FC, and a computing mechanism COM that controls the valve 1 and performs various computations, and these components are modularized by being housed in a single case.

Each component will now be described.

The valve is a piezo valve 1 and the degree of opening thereof is controlled by charge control rather than by voltage control as will be discussed later.

The flow-rate sensor 2, which is a thermal flow-rate sensor 2 that measures the flow rate based on the temperature of the fluid, has a laminar flow element 21 (fluid resistor) provided in the internal flow channel FC, a metal narrow tube 22 that bypasses around the laminar flow element 21 and two heating resistors 23 wound around the outside of the narrow tube 22, and is constituted by a constant temperature control circuit that performs control such that a constant temperature is maintained in each heating resistor 23, and a flow-rate measurement value calculation unit 24 whose function is realized by the computing mechanism COM and that calculates the flow rate based on the voltage that is applied to the heating resistors 23. With this thermal flow-rate sensor 2, a large time delay exists between a flow-rate measurement value $Q_M$ that is output and a real flow-rate value $Q_{real}$ of the fluid that actually flows through the internal flow channel FC, as compared with a pressure flow-rate sensor.

The computing mechanism COM is a so-called computer provided with a CPU, a memory, an A/D and a D/A converter, various input-output devices and the like, and exhibits the function of a flow-rate control unit 3 that controls the flow rate of the fluid using at least the flow-rate measurement value calculation unit 24 and the piezo valve 1 that were mentioned above, by the various devices cooperating and executing a flow-rate control program that is stored in the memory.

The flow-rate control unit 3 controls the degree of opening of the piezo valve 1 based on the flow-rate measurement value $Q_M$ measured with the thermal flow-rate sensor 2 and a flow-rate setting value $Q_r$ that is set by the user, and controls the flow rate of the fluid. In the present embodiment, the flow-rate control unit 3 is configured to control the degree of opening of the piezo valve 1 by two degree-of-freedom control that combines feedback control (FB control) and feedforward control (FF control). Also, this flow-rate control unit 3 realizes flow-rate control that takes into account the time delay of the flow-rate measurement value $Q_M$ output from the thermal flow-rate sensor 2 relative to the real flow-rate value, enabling ideal transient response characteristics and steady-state characteristics to be obtained.

Figure 2:
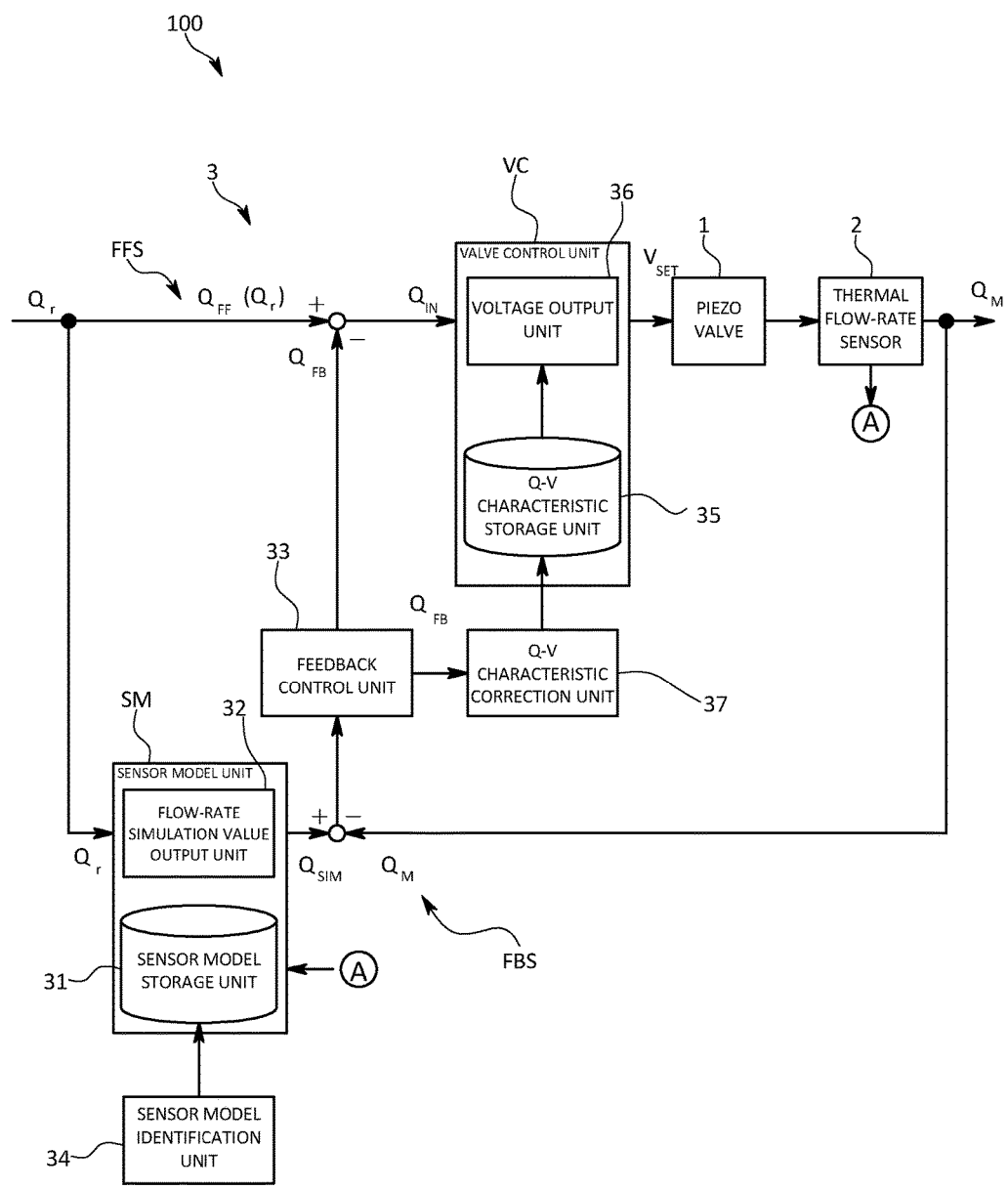
FIG. 2 is a schematic block diagram showing a flow-rate control unit in detail and a control system in the embodiment.

More specifically, as shown in the control block diagram of FIG. 2, the flow-rate control unit 3 is constituted by a feedback control system FBS that generates a flow-rate feedback value $Q_{FB}$ based on the flow-rate setting value $Q_r$ that is set by the user and the flow-rate measurement value $Q_M$ that is measured with the thermal flow-rate sensor 2, a feedforward control system FFS that generates a flow-rate feedforward value $Q_{FF}$ based on the flow-rate setting value $Q_r$, and a valve control unit VC that controls a valve application voltage $V_{SET}$ that is applied to the piezo valve 1 based on the flow-rate feedback value $Q_{FB}$ and the flow-rate feedforward value $Q_{FF}$ and controls the degree of opening of the piezo valve 1.

The feedback control system FBS is constituted by a sensor model unit SM that outputs a flow-rate simulation value $Q_{SIM}$ that simulates the flow-rate measurement value $Q_M$ that is currently being output from the thermal flow-rate sensor 2 based on the flow-rate setting value $Q_r$, and a feedback control unit 33 that outputs the flow-rate feedback value $Q_{FB}$ based on the flow-rate simulation value $Q_{SIM}$ that is output by the sensor model unit SM and the flow-rate measurement value $Q_M$ that is actually measured with the thermal flow-rate sensor 2.

The sensor model unit SM is constituted by a sensor model storage unit 31 that stores a sensor model that simulates the response characteristics of the thermal flow-rate sensor 2 in the case where the flow-rate setting value $Q_r$ is the input and the flow-rate measurement value $Q_M$ is the output, and a flow-rate simulation value output unit 32 that outputs the flow-rate simulation value $Q_{SIM}$, which is the flow-rate value that the sensor model outputs when the flow-rate setting value $Q_r$ is input.

The sensor model that is stored in the sensor model storage unit 31 simulates at least the step response characteristic of the thermal flow-rate sensor 2, and the sensor model storage unit 31 stores a transfer function representing that response characteristic. It should be noted here that the sensor model models the thermal flow-rate sensor 2, and that the piezo valve 1 and the valve control unit VC are not modeled. That is, because the piezo valve 1 whose response characteristics change over time and depending on the usage state is not included in the model, modeling is facilitated and, moreover, large modeling errors can be avoided.

Figure 3:
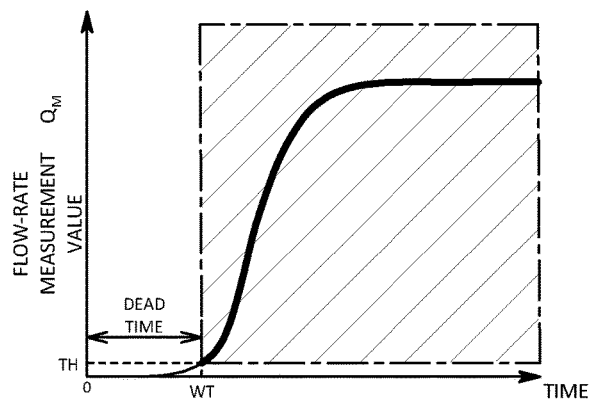
FIG. 3 are schematic graphs showing measurement data that is used in identification of a sensor model in the embodiment.
Figure 3:
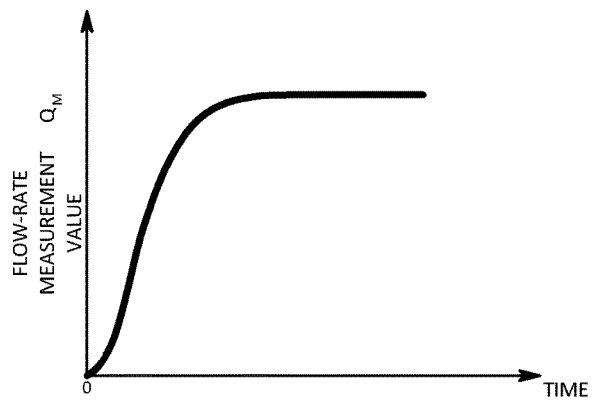
Figure 3:
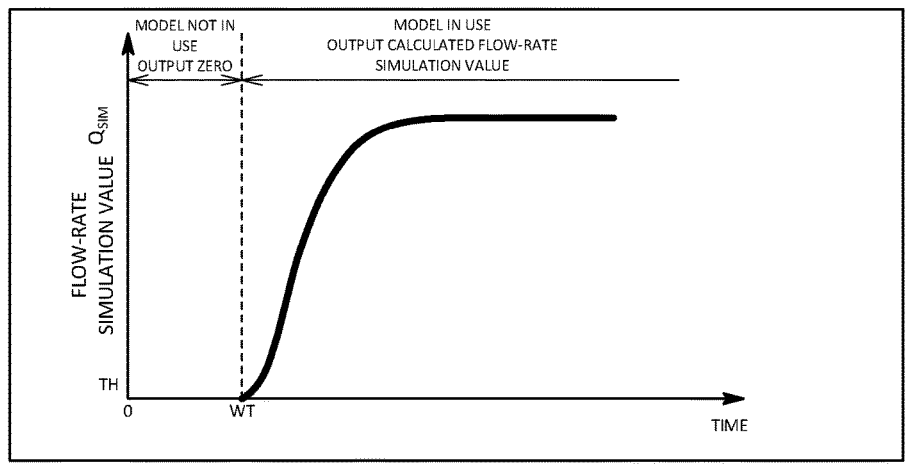

The sensor model that is stored in the sensor model storage unit 31 is identified by a sensor model identification unit 34 based on the flow-rate measurement value QM that is measured when the mass flow controller 100 of the present embodiment is open-loop controlled. More specifically, the sensor model identification unit 34 operates only in the case where the mass flow controller 100 is set to a model identification mode rather than a flow-rate control mode. In the model identification mode, the sensor model identification unit 34 acquires an open-loop response characteristic after a step input is input as the flow-rate setting value Qr and the flow-rate measurement value QM that is output from the thermal flow-rate sensor 2 exceeds a predetermined threshold TH as shown in FIG. 3 at (a). Next, the sensor model identification unit 34 is configured to parallelly shift the step response characteristic from which dead time has been omitted, which is shown with a thick line in FIG. 3 at (a), that is, the diagonally hatched region, to the zero point as a step response that does not include dead time as shown in FIG. 3 at (b), and identify the sensor model from the step response characteristic after this parallel shift.

The flow-rate simulation value output unit 32 shown in FIG. 2 is configured to start outputting the flow-rate simulation value $Q_{SIM}$ based on the sensor model and the flow-rate setting value $Q_r$, after the flow-rate measurement value $Q_M$ that is measured with the thermal flow-rate sensor 2 reaches the predetermined threshold TH. More specifically, the flow-rate simulation value output unit 32 continues outputting zero as the flow-rate simulation value $Q_{SIM}$ until the flow-rate measurement value $Q_M$ that is measured with the thermal flow-rate sensor 2 reaches the threshold TH, even after input of the flow-rate setting value $Q_r$ has started and flow-rate control has started. When the flow-rate measurement value $Q_M$ that is measured with the thermal flow-rate sensor 2 exceeds the threshold TH, the flow-rate simulation value output unit 32 calculates the flow-rate simulation value $Q_{SIM}$ based on the sensor model and the flow-rate setting value $Q_r$, with the time at which the flow-rate measurement value $Q_M$ reached the threshold TH as the zero point.

The feedback control unit 33 shown in FIG. 2 is configured to perform a PID operation on the deviation between the flow-rate simulation value $Q_{SIM}$ and the flow-rate measurement value $Q_M$, and calculate the flow-rate feedback value $Q_{FB}$. That is, in the case where the valve control unit VC and the piezo valve 1 are operating ideally, and the deviation between the flow-rate simulation value $Q_{SIM}$ and the flow-rate measurement value $Q_M$ is zero, the valve control unit VC controls the piezo valve 1 with only the flow-rate feedforward value $Q_{FF}$. On the other hand, in the case where the flow-rate measurement value $Q_M$ differs from the flow-rate simulation value $Q_{SIM}$ under the influence of a disturbance or the like when the degree of opening of the piezo valve 1 is controlled with only the flow-rate feedforward value $Q_{FF}$, the flow-rate feedback value $Q_{FB}$ will be a non-zero value. Accordingly, a conditional feedback structure is realized according to which the degree of opening of the piezo valve 1 is corrected as a result of the flow-rate feedforward value $Q_{FF}$ being corrected by the flow-rate feedback value $Q_{FB}$, only in the case where the flow-rate measurement value $Q_M$ is not output as expected.

The feedforward control system FFS is constituted in this embodiment to output the received flow-rate setting value $Q_r$ directly to the valve control unit VC as the flow-rate feedforward value $Q_{FF}$. Although a block is not illustrated in the relevant location of the block diagram in FIG. 2, the feedforward control system FFS would, in an exact depiction, be representing as a feedforward control unit (not shown) in which the flow-rate setting value $Q_r$ that is input is multiplied by one and output as the flow-rate feedforward value $Q_{FF}$.

The valve control unit VC is configured to receive input of the sum of the flow-rate feedforward value $Q_{FF}$ and the flow-rate feedback value $Q_{FB}$ as a flow-rate input value $Q_{IN}$, and apply the valve application voltage $V_{SET}$ corresponding to the degree of opening of the piezo valve 1 that realizes the flow-rate input value $Q_{IN}$ to the piezo valve 1. More specifically, the valve control unit VC is constituted by a Q-V characteristic storage unit 35 that stores a Q-V characteristic, which is the relationship between the valve application voltage $V_{SET}$ and the flow rate of the fluid that flows through the flow channel in the case where the valve application voltage $V_{SET}$ is applied, and a voltage output unit 36 that calculates the valve application voltage $V_{SET}$ corresponding to the flow-rate input value $Q_{IN}$, which is the sum of the flow-rate feedforward value $Q_{FF}$ and the flow-rate feedback value $Q_{FB}$, based on the Q-V characteristic, and outputs the calculated valve application voltage $V_{SET}$ to the piezo valve 1.

Figure 4:
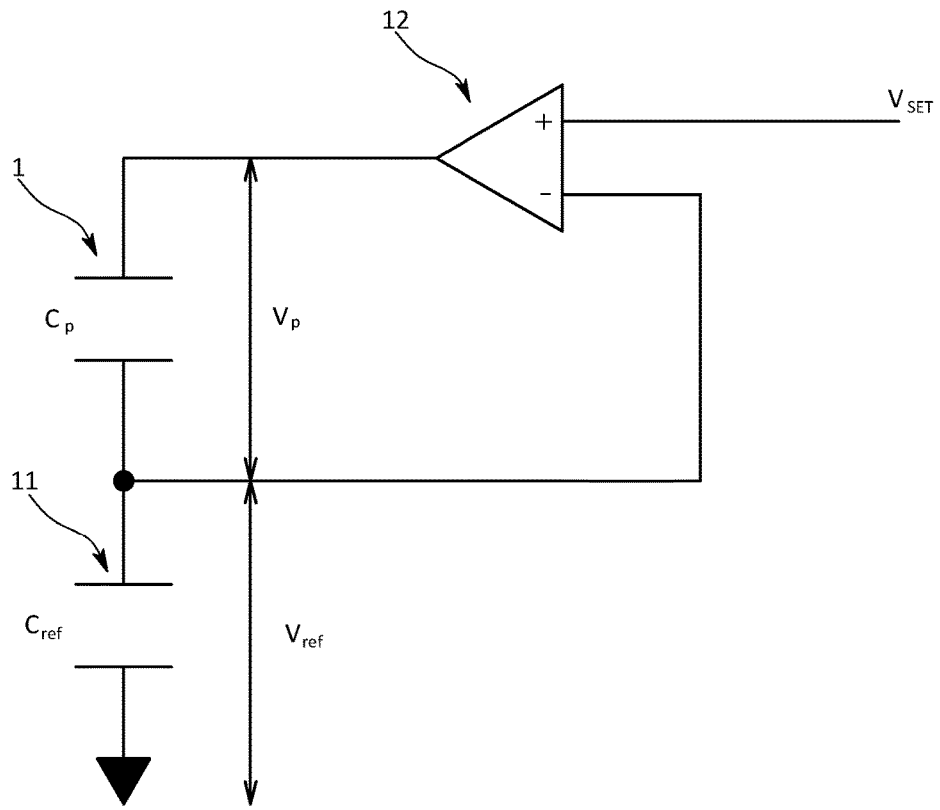
FIG. 4 is a circuit diagram showing configurations of a voltage output unit and a piezo valve in the embodiment.

Incidentally, hysteresis is known to occur in the Q-V characteristic in the case where the piezo valve 1 is voltage-controlled. In the present embodiment, the degree of opening of the piezo valve 1 is controlled by charge control in order to suppress this hysteresis and further enhance flow-rate control accuracy. That is, as shown in FIG. 4, one end of a reference capacitor 11 whose capacitance is not readily affected by disturbances such as temperature changes is connected in series to the piezo valve 1 and the other end is grounded, and the valve control unit VC is configured to keep the voltage that is applied to the piezo valve 1 at the valve application voltage $V_{SET}$. That is, the feedback circuit is constituted by an operational amplifier 12 such that both ends of the capacitance of the piezo valve 1 are kept at the application voltage. With a configuration such as the above, the electric charge will always be the same in the case where the same application voltage is applied even if the capacitance in the piezo valve 1 changes, enabling hysteresis in the Q-V characteristic to be substantially eliminated. In the diagram showing the Q-V characteristic that is used for the following description, hysteresis is not shown because of such a configuration being assumed.

Furthermore, as shown in FIG. 2, in the present embodiment, a Q-V characteristic correction unit 37 that corrects the Q-V characteristic stored in the Q-V characteristic storage unit 35 based on the flow-rate feedback value $Q_{FB}$ is further provided. This Q-V characteristic correction unit 37 does not correct the Q-V characteristic, in the case where the flow-rate feedback value $Q_{FB}$ is maintained at substantially zero and the desired response characteristics can be realized by performing only flow-rate control using the flow-rate feedforward value $Q_{FF}$. On the other hand, in the case where the flow-rate feedback value $Q_{FB}$ is a value other than zero, the Q-V characteristic stored in the Q-V characteristic storage unit 35 is corrected using the integral of this flow-rate feedback value $Q_{FB}$ by being parallelly shifted in a predetermined direction, such that at the time of the next step response the desired response characteristics can be obtained with only the flow-rate feedforward value $Q_{FF}$.

More specifically, the Q-V characteristic correction unit 37 is configured to perform correction by offsetting the Q-V characteristic in the V-axis positive direction in the case where the integral of the flow-rate feedback value $Q_{FB}$ within a predetermined time period from the start of flow-rate control is positive, and to perform correction by offsetting the Q-V characteristic in the V-axis negative direction in the case where the integral is negative.

Operations of Present Embodiment

Hereinafter, control operations of the mass flow controller 100 of the present embodiment and the correction operation of the Q-V characteristic correction unit 37 will be described using a specific example of flow-rate control.

First, the case where ideal response characteristics are not obtained with only the flow-rate feedforward value QFF in one step response will be described with reference to FIG. 5.

Figure 5:
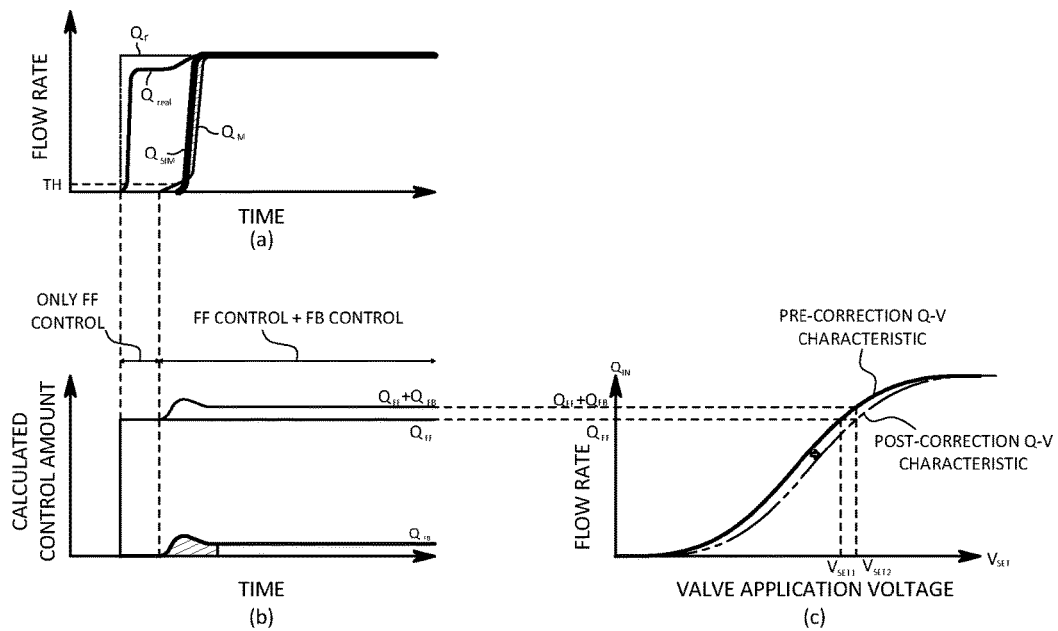
FIG. 5 are schematic graphs showing a first step response in the case where FF control and FB control are performed and the respective control amounts in the embodiment.

FIG. 5 at (a) shows the responses of the real flow-rate value Qreal, the flow-rate simulation value QSIM and the flow-rate measurement value QM in the case where a step input is input as the flow-rate setting value Qr. Note that the real flow-rate value Qreal can be obtained by passing the output of the thermal flow-rate sensor 2 through the inverse of the transfer function of the sensor model.

In FIG. 5, since the Q-V characteristic of the piezo valve 1 changes from the initial setting due to certain factors, the real flow-rate value Qreal is firstly stabilized at a lower flow rate than the flow-rate setting value Qr that is realized by FF control, and subsequently stabilized at the flow-rate setting value Qr as a result of the deviation being corrected by FB control.

The reason for using such flow-rate control is roughly as follows.

Because the flow-rate measurement value QM that is output from the thermal flow-rate sensor 2 has a time delay relative to the real flow-rate value Qreal, the flow-rate measurement value QM will rise after a predetermined time period has elapsed from the rising point of the real flow-rate value Qreal, as shown in FIG. 5 at (a). In a first interval which is the interval from the rising point of this real flow-rate value Qreal until the rising point of the flow-rate measurement value QM, the sensor model unit SM continues to output zero as the flow-rate simulation value QSIM because the flow-rate measurement value QM has not exceeded the threshold TH. Accordingly, the feedback control unit 33 also continues to output zero as the flow-rate feedback value QFB as shown in FIG. 5 at (b) because the deviation between the flow-rate simulation value QSIM and the flow-rate measurement value QM is zero in this first interval. That is, even if a deviation occurs between the flow-rate setting value Qr and the real flow-rate value Qreal, the deviation is not corrected since only FF control is performed in the first interval. Also, as shown in FIG. 5 at (c), in this first interval, the valve control unit VC acquires a voltage VSET1 as the valve application voltage VSET that should be applied, by referring to the current Q-V characteristic using only the flow-rate feedforward value QFF, and continues applying the voltage VSET1 to the piezo valve 1.

Next, in a second interval which is the interval after the rising point of the flow-rate measurement value QM, the sensor model unit SM starts outputting the flow-rate simulation value QSIM that is based on the sensor model from the point in time at which the flow-rate measurement value QM exceeds the threshold TH. Then because a deviation other than zero occurs between the flow-rate simulation value QSIM and the flow-rate measurement value QM in the second interval as shown by the hatched portion in FIG. 5 at (a), the feedback control unit 33 starts FB control by outputting a flow-rate feedback value QFB other than zero as shown in FIG. 5 at (b). The flow-rate feedback value QFB ultimately becomes constant at the value at the point in time that the deviation between the flow-rate simulation value QSIM and the flow-rate measurement value QM is eliminated, and the real flow-rate value Qreal also stabilizes at the flow-rate setting value Qr. Also, as shown in FIG. 5 at (c), in this second interval, the valve control unit VC acquires a voltage VSET2 as the valve application voltage VSET that should be applied, by referring to the current Q-V characteristic using the sum of the flow-rate feedforward value QFF and the flow-rate feedback value QFB, and applies the voltage VSET2.

The reason that FB control is thus also introduced in addition to FF control is because the current Q-V characteristic stored in the Q-V characteristic storage unit 35 is such as shown with the thick line in FIG. 5 at (c), whereas the actual Q-V characteristic is such as shown with the imaginary line, and thus the value referred to is smaller than the valve application voltage VSET that should actually be applied.

In view of this, the Q-V characteristic correction unit 37 operates to correct the Q-V characteristic such that the valve application voltage $V_{SET}$ that should actually be applied is acquired from the Q-V characteristic with only the flow-rate feedforward value $Q_{FF}$, and store the corrected Q-V characteristic in the Q-V characteristic storage unit 35.

Specifically, in the case where the flow-rate feedback value QFB is output as shown by the hatched portion of FIG. 5 at (b) and the integral within the predetermined period is positive, the Q-V characteristic correction unit 37 corrects the current Q-V characteristic to a Q-V characteristic obtained by parallelly shifting the current Q-V characteristic in the V-axis positive direction. The amount of parallel shift at this time is set such that the voltage VSET2 referred to in the stable state of the second interval is referred to with the current flow-rate feedforward value QFF.

In contrast, in a case such as where the real flow-rate value $Q_{real}$ is stabilized at a larger value than the flow-rate setting value $Q_r$ and the integral of the flow-rate feedback value $Q_{FB}$ becomes negative, the Q-V characteristic correction unit 37 corrects the current Q-V characteristic to a Q-V characteristic obtained by parallelly shifting the current Q-V characteristic in the V-axis negative direction.

A second step response after the Q-V characteristic has thus been corrected by the Q-V characteristic correction unit 37 will be described with reference to FIG. 6.

Figure 6:
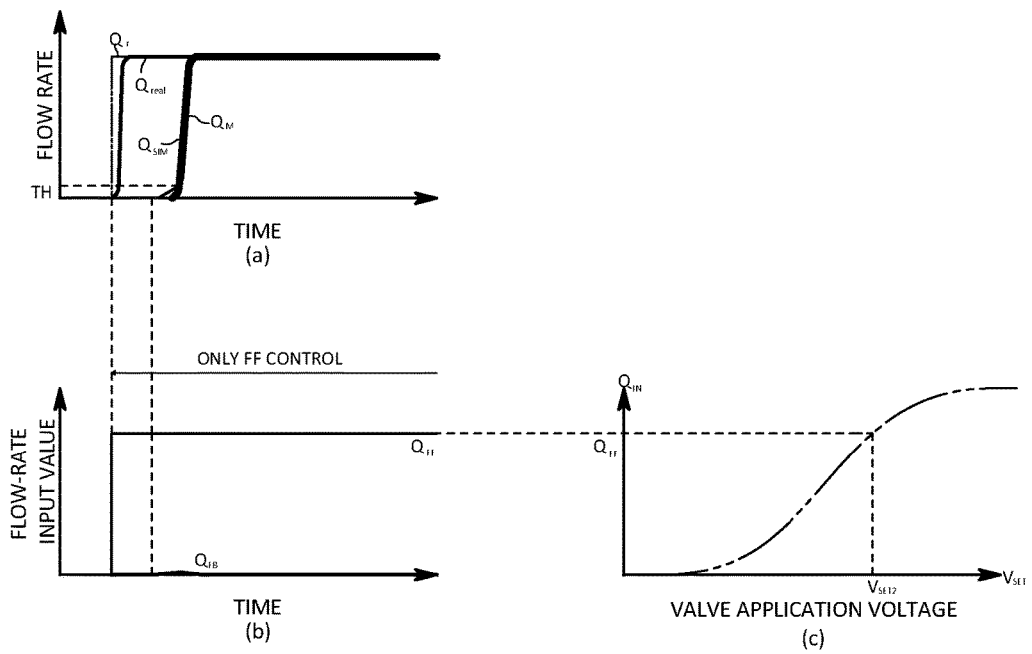
FIG. 6 are schematic graphs showing a second step response after a Q-V characteristic is corrected based on the first step response and the control amount in the embodiment.

Although only the flow-rate feedforward value QFF is output in the first interval of FIG. 6 at (a) similarly to FIG. 5, the Q-V characteristic correction unit 37 corrects the Q-V characteristic using the first step response, and thus the valve application voltage VSET that the valve control unit VC acquires is changed to the voltage VSET2 with only the flow-rate feedforward value QFF as shown in FIG. 6 at (c). Thus, because the flow-rate setting value Qr that is targeted can be substantially achieved even with only the flow-rate feedforward value QFF, the deviation between the flow-rate simulation value QSIM and the flow-rate measurement value QM is substantially eliminated as shown in FIG. 6 at (a) and FIG. 6 at (b), and FB control is also hardly performed. That is, flow-rate control is realized substantively at the flow-rate setting value Qr with only FF control.

Effects of Embodiment

According to the mass flow controller 100 of the present embodiment as described above, because the sensor model unit SM is configured to be able to output an ideal flow-rate simulation value $Q_{SIM}$ that is achieved in the case where FF control is realized normally by causing a time delay triggered by the value of the flow-rate measurement value $Q_M$, it is possible to obtain a flow-rate simulation value $Q_{SIM}$ that is adjusted for the time delay of the flow-rate measurement value $Q_M$ that is output from the thermal flow-rate sensor 2. Accordingly, it is possible to prevent problems such as overshoot occurring or control becoming unstable due to FB control being over applied when a large deviation occurs because of the time delay of the flow-rate simulation value $Q_{SIM}$ not matching the time delay of the flow-rate measurement value $Q_M$ when flow-rate control is started.

Also, because a time delay is implemented by being triggered by the value of the flow-rate measurement value $Q_M$, the sensor model identification unit 34 is able to enhance modeling accuracy without needing to identify the sensor model as a transfer function that includes a time delay. The stability of flow-rate control can thereby be enhanced by reducing modeling errors.

Furthermore, because the Q-V characteristic correction unit 37 is configured to appropriately correct the Q-V characteristic based on the flow-rate feedback value $Q_{FB}$, such that an appropriate valve application voltage $V_{SET}$ is applied with only the flow-rate feedforward value $Q_{FF}$, a high-speed response can be realized substantially constantly. In other words, this mass flow controller 100 realizes a high-speed response by substantially controlling the flow rate with only FF control using the flow-rate feedforward value $Q_{FF}$ while the Q-V characteristic is normal, but in the case where the Q-V characteristic changes due to the influence of a disturbance or the like, FB control is applied and the flow-rate setting value $Q_r$ is reliably realized with a slight delay. Furthermore, because the Q-V characteristic correction unit 37 corrects the Q-V characteristic so as to reflect the actual state in the case where such a change occurs in the Q-V characteristic and FB control is performed, a high-speed response can be again realized with only FF control from the next step response onward.

Other embodiments will now be described.

In the embodiment, a piezo valve was used as the valve and a thermal flow-rate sensor was used as the flow-rate sensor, but other valves and sensors can be used. More specifically, a solenoid valve or the like may be used as the valve, and a pressure flow-rate sensor may be used as the flow-rate sensor. Also, the order in which the valve and the flow-rate sensor are arranged in the internal flow channel is not limited to that shown in the diagrams, and this order may be varied.

For example, the mass flow controller may be configured without the sensor model identification unit and the Q-V characteristic correction unit. That is, the two degree-of-freedom flow-rate control device shown in the embodiment may be configured, and the state of the sensor model and the Q-V characteristic at the time of factory shipment may be maintained. Also, the flow-rate simulation value output unit need only be configured to output a flow-rate simulation value that includes a predetermined time delay, and is not limited to starting output of the flow-rate simulation value triggered by the flow-rate measurement value shown in the embodiment.

For example, a configuration may be adopted in which, in the case where the sensor model of the flow-rate sensor stored in the sensor model storage unit is not identified as including a time delay element, the flow-rate simulation value output unit starts outputting the flow-rate simulation value based on the flow-rate setting value and the sensor model once a predetermined time period has elapsed after input of the flow-rate setting value is started and flow-rate control is started. Alternatively, a configuration may be adopted in which, in the case where the sensor model storage unit stores a sensor model modeled to include the time delay of the flow-rate measurement value relative to the real flow-rate value, the flow-rate simulation value output unit starts calculation and output of the flow-rate simulation value based on the flow-rate setting value and the sensor model at the same time as input of the flow-rate setting value.

In the embodiment, the flow-rate feedforward value was set to the same value as the flow-rate setting value, but a value obtained after filtering such as S-curve interpolation of portions such as where the time rate of change from the flow-rate setting value is too large may be used as the flow-rate feedforward value, for example.

The Q-V characteristic correction unit determined the direction for correcting the Q-V characteristic based on the integral of the flow-rate feedback value, but may also determine the correction amount based on the integral of the flow-rate feedback value. Also, in the embodiment, the Q-V characteristic was corrected by parallelly shifting the Q-V characteristic in the V-axis direction, but may be corrected with various methods such as, for example, parallelly shifting the Q-V characteristic in the Q-axis direction or multiplying the Q-V characteristic by a predetermined coefficient that is based on the flow-rate feedback value.

Also, in the embodiment, the Q-V characteristic correction unit is configured to correct the entire Q-V characteristic through parallel shifting, but the Q-V characteristic correction unit may be configure to correct only part of the Q-V characteristic. For example, the Q-V characteristic correction unit may be configured to correct only the valve application voltage of the portion corresponding to the flow rate set as the flow-rate setting value in the Q-axis or V-axis direction.

The valve control unit of the embodiment was configured to control the degree of opening of the valve through charge control, but other control modes may be adopted. For example, a valve control unit VC that forms a minor loop for controlling the degree of opening of the valve in addition to the feedback loop of the flow-rate measurement value may be constituted using an position sensor 38 that directly measures the degree of opening of the valve as shown in FIG. 7.

Figure 7:
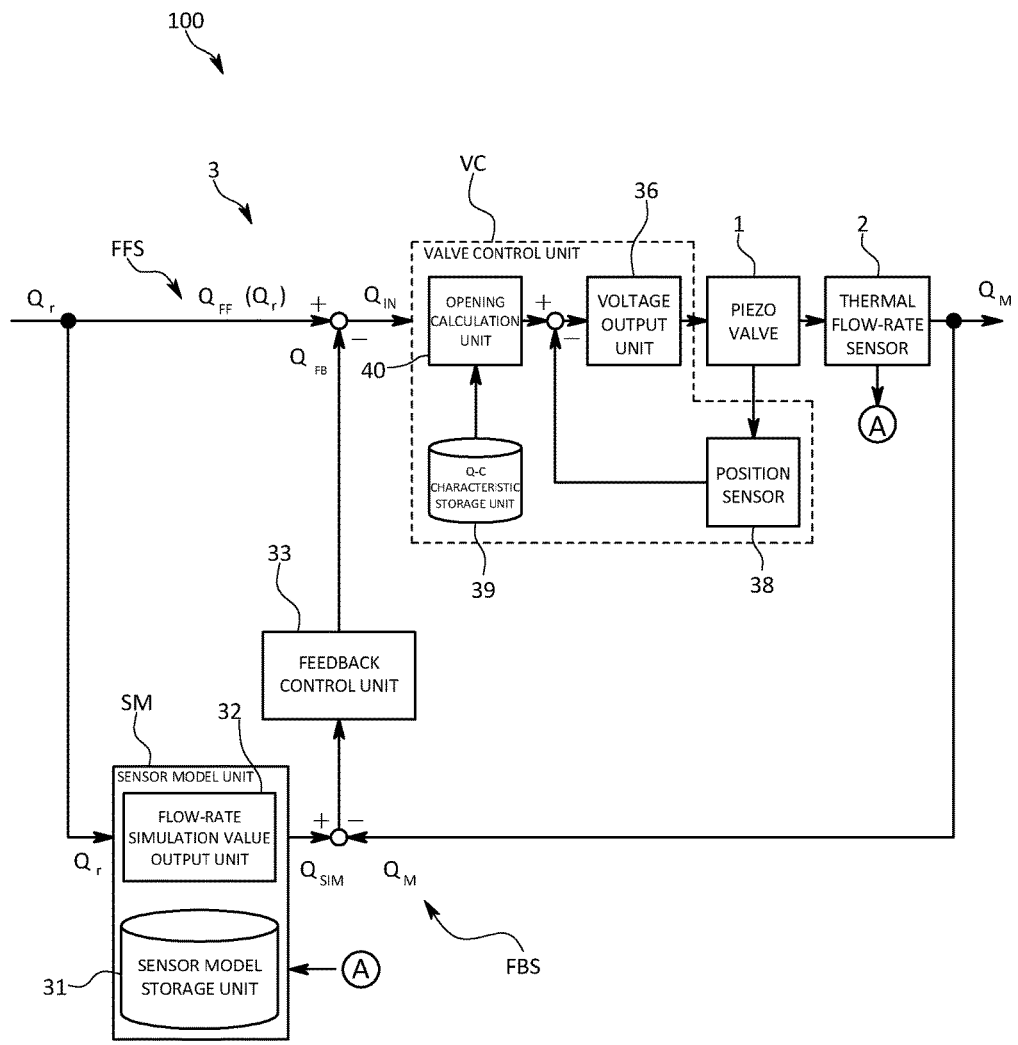
FIG. 7 is a schematic diagram showing a flow-rate control device in another embodiment of the present invention.

More specifically, the valve control unit VC shown in FIG. 7 is provided with an opening calculation unit 40 that calculates the degree of opening to be set, based on the flow-rate input value $Q_{IN}$ that is calculated by the feedforward control system FFS and the feedback control system FBS. The opening calculation unit 40 calculates an opening setting value corresponding to the flow-rate input value QIN, with reference to a Q-C characteristic storage unit 39 that stores a Q-C characteristic which is the relationship between the flow rate and the degree of opening (conductance) of the piezo valve 1. The voltage output unit 36 that constitutes the minor loop has a different configuration from the embodiment, and is configured to determine the application voltage $V_{SET}$ to be applied to the piezo valve 1 based on the deviation between the current opening measurement value of the piezo valve 1 measured by the position sensor 38 and the opening setting value, and output the application voltage $V_{SET}$ to the piezo valve 1. With such a configuration, the degree of opening of the piezo valve 1 is directly monitored and feedback control using the minor loop is performed such that the degree of opening achieves the opening setting value, thus enabling hysteresis between the voltage and the degree of opening of the valve to be reduced and accurate flow-rate control to be realized. Note that with regard to the degree of opening, the position of the valve may be directly measured and the degree of opening may be derived from that position, or the degree of opening may be calculated indirectly by other means. Also, flow-rate control may be performed by feeding back the position of the valve itself.

The abovementioned valve control unit may be configured such that the desired degree of opening or flow rate is obtained through voltage control for controlling the voltage that is applied to the valve or current control for controlling the current, in addition to controlling the degree of opening of the valve by charge control or opening control.

Also, the voltage to be output from the voltage output unit to the valve was determined based on the flow-rate input value $Q_{IN}$ and the Q-V characteristic or Q-C characteristic of the valve, but the valve control unit may be further configured such that the degree of opening corresponding to the realized flow rate is realized by the valve in consideration of the pressure upstream of the valve. More specifically, in the embodiment and other embodiments, a two-dimensional Q-V characteristic or Q-C characteristic was stored in the storage unit as the characteristic of the valve, but a Q-V-P characteristic or a Q-C-P characteristic serving as a three-dimensional map to which a pressure axis is further added may be stored, and the valve control unit may be configured such that a voltage V or degree of opening C corresponding to the input flow-rate value QIN and the current pressure upstream of the valve is output. Also, the Q-V characteristic correction unit of the embodiment may be configured as a Q-V-P characteristic correction unit or a Q-C-P characteristic correction unit that corrects the Q-V-P characteristic or the Q-C-P characteristic based on the flow-rate feedback value. In addition, in the case where the flow-rate control device is configured to control the flow rate Q by feeding back a position or a degree of opening T of the valve measured with a displacement sensor or the like, the Q-V characteristic storage unit of the embodiment may be configured as a Q-T characteristic storage unit, and the Q-V characteristic correction unit may be configured as a Q-T characteristic correction unit that corrects a Q-T characteristic based on the flow-rate feedback value. Furthermore, in the case where control is also performed in consideration of the pressure upstream of the valve as described above, the Q-T characteristic storage unit may be configured as a Q-T-P characteristic storage unit that stores a three-dimensional flow rate characteristic including a pressure axis. Furthermore, the Q-T characteristic correction unit may be configured as a Q-T-P characteristic correction unit that corrects a Q-T-P characteristic based on the flow-rate feedback value.

The two degree-of-freedom type control system of the embodiment was used for flow-rate control, but may be used for pressure control, for example. In this case, the flow-rate sensor will be a pressure sensor, and the sensor model of the sensor model unit can be configured to simulate the output characteristics of the pressure sensor.

Also, a similar flow-rate control effect will be obtained by installing a program for configuring the flow-rate control unit described in the embodiment in an existing flow-rate control device.

Additionally, various modifications and embodiments can be combined without departing from the spirit of the invention.

INDUSTRIAL APPLICABILITY

Use of the flow-rate control device of the present invention enables component gas to be accurately introduced into a chamber at a predetermined flow rate in a semiconductor manufacturing process, for example.

The invention claimed is:
1. A flow-rate control device comprising:
a flow-rate sensor that measures a flow rate of a fluid that flows through a flow channel;
a valve provided in the flow channel; and
a flow-rate control unit that controls the flow rate using the valve based on a flow-rate setting value and a flow-rate measurement value that is measured with the flow-rate sensor;
wherein the flow-rate control unit includes:
a sensor model storage unit that stores a sensor model that simulates a response characteristic of the flow-rate sensor;
a flow-rate simulation value output unit that outputs a flow-rate simulation value which is a flow-rate value calculated based on the flow-rate setting value and the sensor model;
a feedback control unit that outputs a flow-rate feedback value based on a deviation between the flow-rate measurement value and the flow-rate simulation value; and
a valve control unit that controls the valve based on the flow-rate feedback value and a flow-rate feedforward value that is calculated from the flow-rate setting value,
wherein the flow-rate simulation value includes a predetermined time delay.
2. The flow-rate control device according to claim 1, wherein the flow-rate simulation value output unit is configured to start outputting the flow-rate simulation value based on the sensor model and the flow-rate setting value, after the flow-rate measurement value that is measured with the flow-rate sensor reaches a predetermined threshold.
3. The flow-rate control device according to claim 2, further comprising:
a sensor model identification unit that identifies the sensor model based on an open loop response characteristic acquired after a step input is input as the flow-rate setting value and the flow-rate measurement value output from the flow-rate sensor exceeds the threshold.
4. The flow-rate control device according to claim 1, wherein the valve control unit includes:
a Q-V characteristic storage unit that stores a Q-V characteristic which is a relationship between a valve application voltage and the flow rate of the fluid that flows through the flow channel when the valve application voltage is applied to the valve; and
a voltage output unit that calculates the valve application voltage corresponding to a flow-rate input value which is a sum of the flow-rate feedforward value and the flow-rate feedback value, based on the Q-V characteristic, and outputs the calculated valve application voltage to the valve, and the flow-rate control device further comprises a Q-V characteristic correction unit that corrects the Q-V characteristic stored in the Q-V characteristic storage unit, based on the flow-rate feedback value.

5. The flow-rate control device according to claim 4, wherein the Q-V characteristic correction unit performs correction by offsetting the Q-V characteristic in a V-axis positive direction in a case where an integral of the flow-rate feedback value within a predetermined time period from a start of flow-rate control is positive, and performs correction by offsetting the Q-V characteristic in a V-axis negative direction in a case where the integral is negative.

6. The flow-rate control device according to claim 5, wherein the Q-V characteristic correction unit is configured to determine an offset amount of the Q-V characteristic in the V-axis direction, based on an absolute value of the integral of the flow-rate feedback value within the predetermined time period from the start of flow-rate control.

7. The flow-rate control device according to claim 1, wherein the valve is a piezo valve, the flow-rate control device further comprises a reference capacitor that is connected in series to the piezo valve and is grounded at one end, and the valve control unit is configured to hold a voltage that is applied to the piezo valve at a valve application voltage.

8. The flow-rate control device according to claim 1, wherein the flow-rate sensor is a thermal flow-rate sensor.

9. A flow-rate control program that is used in a flow-rate control device provided with a flow-rate sensor that measures a flow rate of a fluid that flows through a flow channel and a valve provided in the flow channel, the flow-rate control program causing a computer to function as a flow-rate control unit that controls the flow rate using the valve based on a flow-rate setting value and a flow-rate measurement value that is measured with the flow-rate sensor, wherein the flow-rate control unit includes:
  a sensor model storage unit that stores a sensor model that simulates a response characteristic of the flow-rate sensor;
  a flow-rate simulation value output unit that outputs a flow-rate simulation value which is a flow-rate value calculated based on the flow-rate setting value and the sensor model;
  a feedback control unit that outputs a flow-rate feedback value based on a deviation between the flow-rate measurement value and the flow-rate simulation value; and
  a valve control unit that controls the valve based on the flow-rate feedback value and a flow-rate feedforward value that is calculated from the flow-rate setting value, wherein the flow-rate simulation value includes a predetermined time delay.

* * * * *